Figure 1:
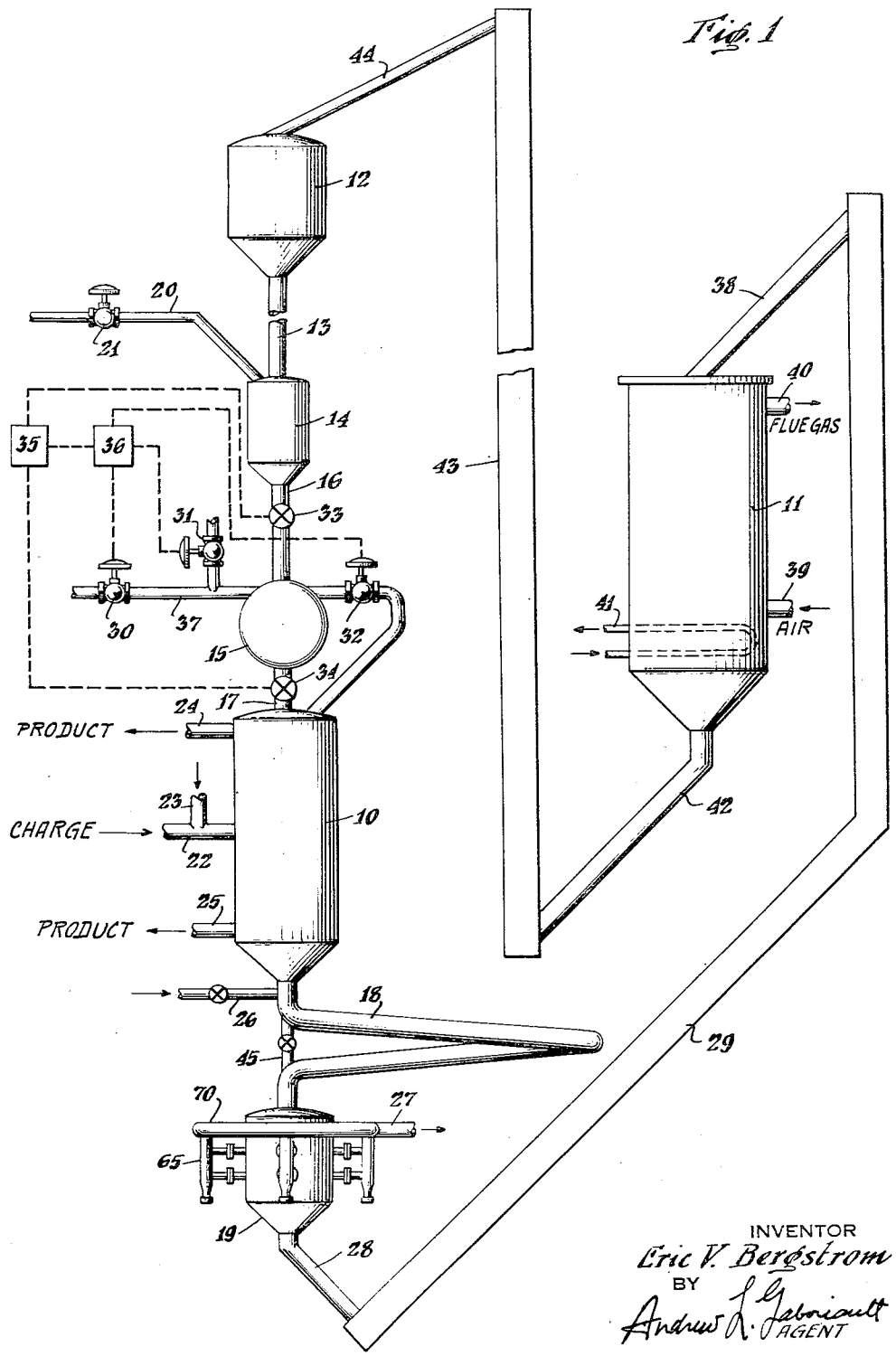

Dec. 18, 1956  E. V. BERGSTROM  2,774,440
GAS DISENGAGER

Filed Dec. 6, 1954  3 Sheets-Sheet 2

INVENTOR
Eric V. Bergstrom
BY
Andrew L. Gabouriault
AGENT

Dec. 18, 1956     E. V. BERGSTROM     2,774,440
GAS DISENGAGER

Filed Dec. 6, 1954     3 Sheets-Sheet 3

INVENTOR
Eric V. Bergstrom
BY
Andrew L. Gabriault
AGENT

United States Patent Office 2,774,440
Patented Dec. 18, 1956

2,774,440

GAS DISENGAGER

Eric V. Bergstrom, Short Hills, N. J., assignor to Socony Mobil Oil Company, Inc., a corporation of New York Application December 6, 1954, Serial No. 473,232

2 Claims. (Cl. 183—1)

This invention deals with an apparatus for the removal of granular solids from a high pressure chamber and for reducing the pressure of the solids so removed to a substantially lower pressure. It is particularly concerned with the apparatus whereby the gas is separated from the solids to effect the pressure reduction.

Typical of the processes to which this invention may be applied is the continuous catalytic reforming of gaseous hydrocarbons, wherein the hydrocarbons are contacted with a moving mass of granular solid catalytic contact material in a confined reaction zone to effect the conversion of the hydrocarbons, and the used contact material is then passed to a separate regeneration zone to recondition it for re-use in the reaction zone. Other exemplary processes to which this invention is applicable are catalytic cracking, aromatization, desulfurization, and the like, of fluid hydrocarbons in the presence of a granular catalyst, and the thermal cracking, visbreaking, reforming, and the like, of fluid hydrocarbons in the presence of a granular inert solid.

Granular solids suitable for processes of these types, as well as many other processes with which this invention will find application, include natural or treated clays, bauxite, activated alumina or synthetic associations of silica, alumina, chromia or magnesia, or combinations thereof, to which certain metallic oxides or sulfides may be added in small amounts for specific purposes. Granular solids which are inert in character include refractory materials, such as zirkite, corhart or mullite, or stones or metallic particles or balls.

Granular solids suitable for use in this invention should be of palpable particulate form as distinguished from finely divided powders, and may be of regular shape, such as pellets, tablets, spheres, and the like, or of irregular shape, such as are obtained in grinding and screening operations. Generally, the granular solids should fall within the size range 1 inch to 100 mesh, and preferably 4 to 15 mesh by Tyler Standard Screen Analysis.

In processes of the aforementioned types, as well as many others, it is frequently desirable to conduct the conversion reaction at a substantially higher pressure than the regeneration, so that a problem occurs as to a suitable method for transferring the granular solids from the high pressure reaction zone to the lower pressure regeneration zone while maintaining constantly the desired pressure in each. Where the pressure differential between the two zones is low, for example, less than 30 pounds per square inch, a very satisfactory system known to the prior art is to provide an elongated leg or column of granular solids which extends from the high pressure reaction zone to a lower pressure disengaging zone. This disengaging zone is usually maintained at about the pressure of the regeneration zone. Normally, seal gas is supplied to the leg adjacent its upper end and flows downwardly through the leg. The leg or column is of restricted cross-section compared to the reaction and disengaging zones, so that a bed of granular solids with open upper surface is formed in the disengaging zone, through which upper surface seal gas may escape to be removed from the system. This upper surface is in the shape of a cone with apex at the low pressure end of the depressuring leg and sides at the angle of repose of the granular solids. This transfer and depressuring system is desirable because it is inexpensive and simple to operate. However, it was found that when the pressure differential between the reaction and regeneration zones was increased, as is desirable for some conversion processes, such as catalytic reforming, this system did not operate entirely satisfactorily. It was found that with increasing pressure gradient through the depressuring leg, there was a tendency for the leg to suddenly "blow out," that is, empty itself of granular solids with explosive violence. The "blow out" results in loss of pressure in the reactor and possible fire hazard from escaping reactants. This "blow out" phenomenon was noted to occur particularly where the average pressure gradient through the depressuring leg, due to gas flow, is in excess of 1 pound per square inch per foot.

It has been found that the "blow out" of the leg is accompanied, in the conventional system, by a rapid rise in the upper surface of the granular solids bed at the lower end of the leg to a level of possibly several inches above the lower end of the depressuring leg conduit. At this stage the bed presents a level surface rather than its usual inclined surface. The "blow out" probably begins with a slight upward movement of the surface of the bed in the disengager at the low pressure end of the leg which instantaneously increases the granular solids flow through the leg. Normally, because of the restricted size of the leg, there is a throttling orifice effect at its high pressure end, so that any sudden increase in granular solids flow may result in an instantaneous pulling away of the granular solids at the high pressure end of the leg from the accumulation of granular solids above it, so as to void a few inches in the upper end of the leg. This shortens the effective depressuring leg and increases gas flow and the pressure drop per foot across the leg which, in turn, causes a further upward movement of the bed below the leg and the entire process mushrooms to empty the leg.

A major object of this invention is to provide, in a system for transferring granular solids from a high pressure zone to a lower pressure zone, an apparatus for overcoming the above-described difficulty.

Another object of this invention is to provide an apparatus for safely and efficiently transferring granular solids from a high pressure zone to a lower pressure zone.

Another object of this invention is to provide an apparatus for the removal of gaseous material from its association with granular solids without substantial quantities of granular solids being entrained in the gas as it is removed.

These and other objects of this invention will be apparent from the following discussion of the invention.

This invention discloses a gas disengaging chamber for use on the low pressure end of a granular solids depressuring leg, which disengaging chamber will remove gaseous material from the flowing contact material without substantial entrainment but which will nevertheless prevent the above-described "blow out" phenomenon from occurring when the depressuring leg is of the high pressure gradient type. In this invention the depressuring leg terminates within the disengaging chamber. Solid members extend downwardly and outwardly from the lower end of the depressuring leg conduit at an angle with the horizontal greater than about 30 degrees. These solid members can extend all the way to the walls of the disengaging chamber but may terminate short of the walls, provided that they at least terminate so close to the walls that substantially all free surface flow of the granular solids issuing from the depressuring leg is prevented. Extending across the chamber, at a plurality of levels, all lying below the solid members, are a plurality of substantially horizontal plates which extend completely across the chamber at spaced intervals. Spaced apart across each plate are a plurality of nipples which extend through the plate to a level substantially below the plate but substantially above the next plate. These nipples will then define a solids-free space above their lower ends beneath each plate. At least one gas passageway extends outwardly from the chamber at a point below each of these plates but above the lower end of the nipples extending from the plates, so that the passageway will communicate with the solids-free gas space. Each of these passageways, with the possible exception of the lowermost one, is equipped with a flow throttling orifice. A second group of horizontal plates lies below the first group enumerated above. Each of this second group of plates is equipped with apertures, the number of which decrease as the particular plate in question is successively lower in the chamber. The apertures in each plate are arranged in staggered relationship to those in the plate above, so that they receive proportional solids flow therefrom. A granular solids outlet conduit extends from the disengaging chamber at a level below the second group of plates.

Figure 2:
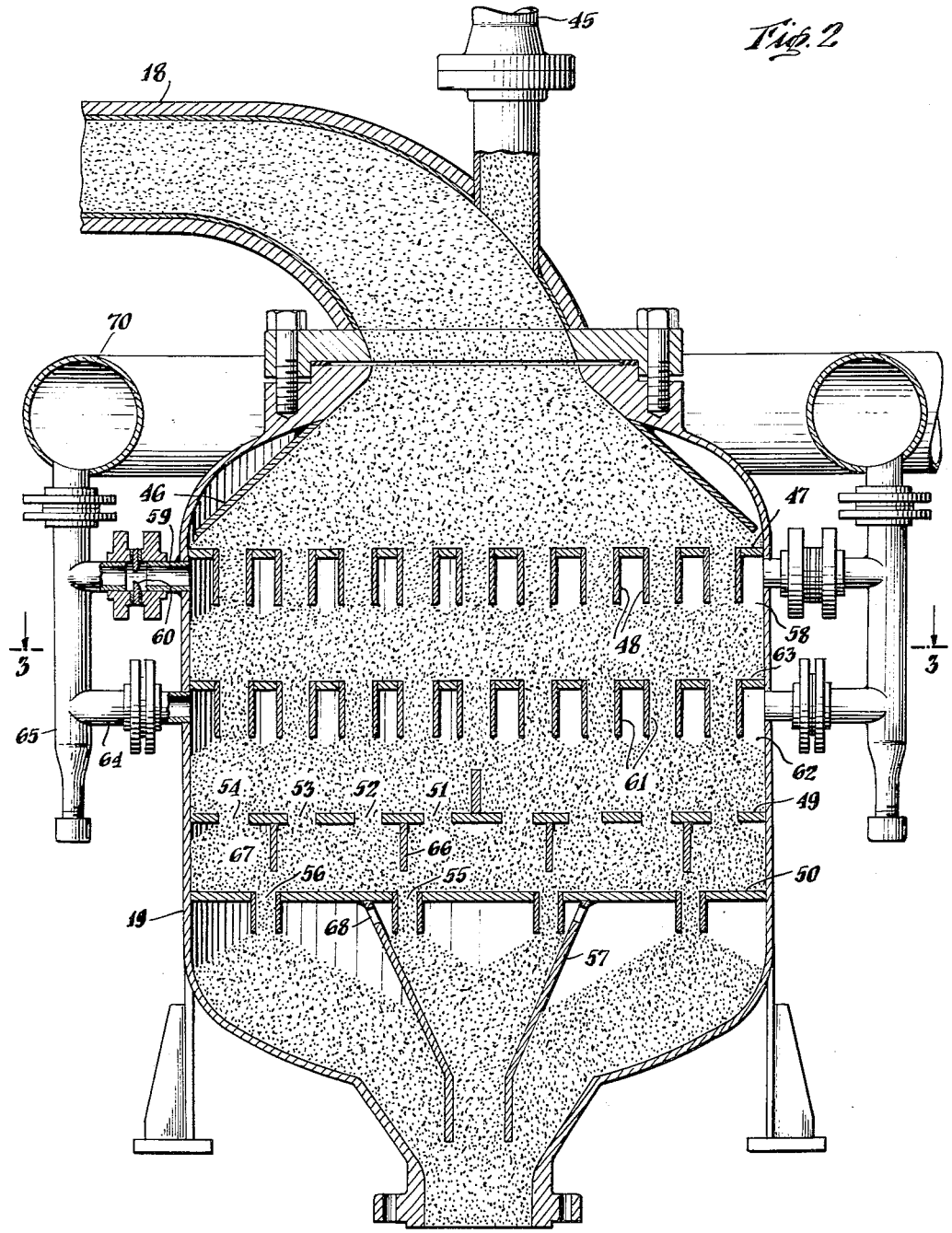
Figure 3:
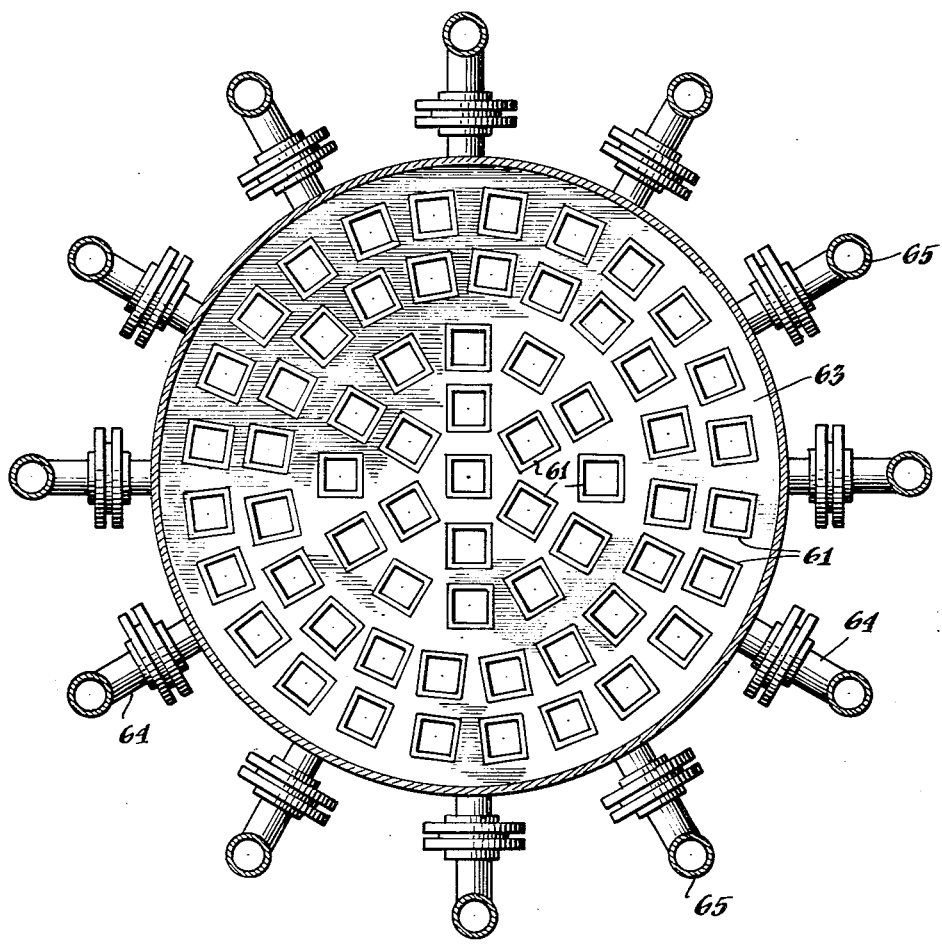

This invention will be best understood by referring to the attached drawings, of which Figure 1 is an elevational view, showing the application of this invention to a catalytic reforming process of the moving mass type;

Figure 2 is an elevational sectional view of the disengaging chamber of this invention; and Figure 3 is a sectional view along line 3—3 of Figure 2.

All of these drawings are diagrammatic in form and like parts in all bear like numerals.

Turning to Figure 1, there is shown there a reaction vessel 10 and a regeneration vessel 11 positioned substantially side by side. Positioned above reactor 10 is a surge hopper 12, from which a seal leg 13 extends downwardly into a seal chamber 14. Positioned between reactor 10 and chamber 14 is a spherical pressure chamber 15, which is connected through its upper end to chamber 14 by conduit 16 and through its lower end to reactor 10 by conduit 17. Extending from the bottom of reactor 10 is a depressuring leg 18 in the form of one turn of a helix. This depressuring leg terminates within disengaging chamber 19, described in detail hereinbelow.

In operation, a fresh granular reforming catalyst, such as a synthetic chromia-alumina catalyst, gravitates from supply hopper 12 downwardly through seal leg 13 into seal chamber 14. Inert seal gas, such as steam or flue gas, is supplied to chamber 14 through conduit 20 at a rate which is controlled by diaphragm valve 21 to maintain within chamber 14 a seal gas pressure slightly in excess of the pressure within supply hopper 12. The catalyst then passes to pressure chamber 15 through passage 16 on a cyclic basis. Within chamber 15 the pressure of the catalyst is raised to the pressure maintained within reactor 10, which typically might be 100 to 300 pounds per square inch absolute.

A typical pressuring cycle may be considered to begin with chamber 15 empty of granular solids and at the same pressure as chamber 14 which, in most operations, will be closed to atmospheric pressure. The cycle starts with valves 30, 31, 32, 33 and 34 all closed. During the cycle all of these valves are operated by controllers 35 and 36. First, valve 33 is opened and chamber 15 filled with granular solids. Valve 33 is then closed and valve 30 opened to admit a pressuring gas, such as hydrocarbon vapor or steam, through conduit 37. By means of this pressuring gas, the pressure in vessel 15 is increased to a pressure near that which exists in reactor 10. Valve 30 is then closed, and valve 32 opened to adjust the pressure within chamber 15 to the pressure within the upper section of reactor 10. Valve 34 is then opened and granular solids flow from chamber 15 through conduit 17 into the upper section of reactor 10. Valves 32 and 34 are then closed and valve 31 is opened to exhaust chamber 15 to the atmosphere. Valve 31 is then closed and a new cycle begins.

The granular catalyst flows through reactor 10 as a downwardly gravitating, substantially compact bed. The catalyst is preferably supplied to this bed at about 700–1050° F. A hydrocarbon charge, which might typically be a petroleum naphtha preheated to a temperature of about 900–1060° F., is admitted centrally to the gravitating bed through passage 22. Hydrogen may be added to the charge as it enters the bed through passage 23. Typically, the mole ratio of hydrogen to naphtha might be 2 to 5. The charge passes both upwardly and downwardly through the bed and products are removed through passages 24 and 25. A typical reactor pressure might be about 175 pounds per square inch gauge. The used granular solids pass from the lower end of reactor 10 into seal leg 18, by means of which the solids are depressured to substantially atmospheric pressure. It will be noted that depressuring leg 18 is disposed in a manner such that granular solids will not flow therethrough under the influence of gravity alone. Proper operation of this leg is the subject of claims in U. S. patent application, Serial No. 519,216, filed June 30, 1955. The pressure gradient through such a leg must, in general, exceed about 1 pound per square inch per foot. In order that reactor 10 may be emptied when it is at atmospheric pressure, a passageway 45, through which gravity flow can be obtained, is provided and connects the upper and lower sections of the leg. Passageway 45 is equipped with a valve which is kept closed during normal operations.

Seal gas, such as steam or hydrocarbon vapor, is admitted to the upper end of the depressuring leg 18 through passage 26 at a pressure slightly in excess of that in reactor 10, so that this seal gas flows downwardly through leg 18. It is separated from the granular catalyst in disengaging chamber 19, to be discharged from the system through passage 27. The granular solids then flow from chamber 19 through passage 28 into a conveyor 29. Conveyor 29 may be of any conventional form suitable for handling hot granular material, such as a bucket elevator or gas lift. Solids flow from the upper end of conveyor 29 through passage 38 into the upper end of regenerator 11. In the regenerator the solids flow downwardly as a substantially compact moving bed. A combustion supporting gas, such as air, is admitted to the lower section of this bed through passage 39 and flows upwardly therethrough to burn from the granular catalyst carbonaceous contaminants deposited thereon in the reaction zone. Flue gas is removed from the upper end of regenerator 11 through passage 40. Cooling coils 41 may be provided within regenerator 11 to insure that the catalytic material does not exceed the heat damaging temperature and to adjust the temperature of the catalytic mtaerial to one suitable for use in reactor 10. The catalyst flows from regenerator 11 through passage 42 and is elevated by means of a second conveyor 43 to a position above hopper 12. Catalyst flows from the conveyor into the upper end of the hopper through passage 44.

Figures 2 and 3 illustrate a disengaging chamber designed according to this invention and will be considered together. Depressuring leg 18 enters the upper end of disengaging chamber 19. Solids flow through this leg in compacted condition. Extending downwardly and outwardly from the lower end of depressuring leg 18 is a hollow frusto-conical shaped hood 46, the solid membered sides of which extend downwardly and outwardly at an angle greater than the angle of repose of the granular solids. The angle of repose will vary with the particular size and shape of solid, but normally it will lie within the range 25 to 45 degrees, and is generally about 30 degrees with the horizontal. The lower end of hood 46 terminates just short of the wall of chamber 19. If desired, the hood could be fixed to the wall. Extending horizontally across chamber 19, below the lower end of hood 46, are plates or partitions 47 and 63. Partition 47 is equipped with a plurality of uniformly spaced-apart square apertures, from each of which depends a square nipple 48, while plate 63 has depending therefrom, in similar manner, uniformly spaced square nipples 61. Each group of nipples 48 and 61 extends downwardly to a common level, which is immediately between the plate from which the nipples depend and the next lowest plate, so that a horizontally continuous accumulation of granular solids and a horizontally continuous gas space will be formed on the plate below the nipples. Immediately below plate 63 are vertically spaced horizontal contact material flow plates 49 and 50 and funnel-shaped member 57. The uppermost plate 49 is equipped with a plurality of uniformly spaced orifices or slots. These orifices are arranged in a plurality of circular patterns 51, 52, 53 and 54, each pattern being of successively increasing diameter by a fixed amount over the pattern next smallest. Plate 50 next below is equipped with proportionally fewer apertures for granular solids flow than plate 49, the apertures in plate 50 being arranged in two circular patterns 55 and 56. Extending downwardly from the underside of plate 50 is a funnel-shaped member 57, so situated as to catch all of the contact material which passes through apertures 55. This member extends downwardly into the inlet end of outlet passageway 28.

In operation, the granular solids and seal gas enter the upper end of disengaging chamber 19 from depressuring leg 18. The solids flow outwardly beneath hood 46. Since there is no free surface flow because of the angle of hood 46, there is no chance that the solids will suddenly expand within the chamber and cause a failure in the depressuring leg 18. Solids and seal gas, at reduced pressure, then pass downwardly through the first row of nipples 48. These nipples serve to form a horizontally continuous gas-free plenum space 58 beneath plate 47. Gas passes around the edge of each nipple and into this plenum space, from which it is withdrawn through passages 59. Each of passages 59 is equipped with a flow throttling orifice 60, which is sufficiently small to prevent gas being withdrawn from the granular solids into space 48 at a rate which will entrain substantial quantities of catalyst and carry them out into passage 59. Solids and the remaining gas flow downwardly and the final quantity of gas separates in plenum space 62, to be removed through passage 64. Passages 59 and 64 feed into a plurality of separate vertical chambers 65, from which the gas flows into manifold 70, to be exhausted from the system through passage 27. The granular solids then proceed downwardly and pass through the orifices or slots in plate 49 and then those in plate 50, to be finally removed through passage 28. The orifices in plate 50, that is, those in circular patterns 55 and 56, are arranged in staggered relationship to those in plate 49. Thus, the streams of granular solids which flow through the orifices in plate 49 are combined uniformly into a fewer number of streams flowing in plate 50, and finally by means of funnel member 57, are combined into two streams and then into a single stream which flows out through passage 28. By this means uniform flow of solids through all parts of the disengaging pot is maintained. The maintenance of such a uniform flow is very necessary to efficient gas disengaging, since without it fine material will tend to accumulate in the parts of the chamber in which solids flow is low, and thus block off gas flow through these parts and thereby cut down the area through which gas may disengage and cause an unsuitably high amount of gas to disengage through other areas, thereby cutting down the disengager capacity.

To insure that orifices 55 draw solids equally from orifices 51 and 52, a cylindrical baffle 66 is provided. This baffle is so placed that the proportion of solids flow which 55 draws from orifices 51, in relation to that drawn from orifices 52, is the same as the proportion of total vessel cross-section served by orifices 51 in relation to that served by orifices 52. Cylindrical baffle 67 performs the same function in the same manner for orifices 53, 54 and 56.

Funnel 57 is equipped with a plurality of holes 68 to insure that there will be no pressure differential between the interior and exterior of funnel 57. The lower end of funnel 57 should be carefully sized so that its cross-sectional area is in the same proportion to the total area of passage 28 at the level of the lower end of 57 as the proportion of the area of disengager 19 served by orifices 51 and 52 bears to the total disengager area. Expressed in another way, the area of the lower end of funnel 57 should be in the same ratio to the total area of outlet 28 at the lower end of funnel 57 as the area of a circle of radius exactly intermediate between the circular patterns of apertures 55 and 56 (or between patterns 52 and 53) bears to the horizontal cross-sectional area of chamber 19. This will insure uniform solids flow at all points above plate 51.

While nipples 48 and 61 are preferably of square cross-section, they may be of any other desired shape such as circular. In disengagers of this type, the amount of gas that can be disengaged is a function of the ratio of the perimeter around which gas disengages to the disengaging area. For the type of device shown in Figures 2 and 3, the perimeter would be the perimeter of all of nipples 48 on the first level and the disengaging area would be the horizontal area between nipples 48. Square shaped nipples give a higher perimeter to area ratio than circular and thus are preferred to circular.

While there have been shown only two disengaging levels, any number of levels in excess of two may be used if desired. It is preferable in such cases that the outlet orifices from each gas space be of increasing area as they are successively lower in the chamber, as this gives maximum disengaging capacity, as disclosed by Ray in U. S. Patent No. 2,459,096. Similarly, more than two solids flow plates beneath nipples 61 may be employed.

*Example*

A disengaging chamber of the type shown in Figures 2 and 3, designed for use with a moving mass type catalytic reformer, consisted of a cylindrical vessel of 3 foot, 6 inch internal diameter and 5 foot, $1\frac{11}{16}$ inch height. A depressuring leg of about $7\frac{1}{4}$ inches internal diameter extended into the upper end of this chamber. A frusto-conical hood, with sides at about a 40 degree angle with the horizontal, was connected to the lower end of the depressuring leg and extended to within $\frac{1}{4}$ inch of the disengaging chamber wall. Beneath this hood were two horizontal plates, the uppermost lying directly below the hood and the lowermost $9\frac{1}{2}$ inches below the upper. Each of these plates had 81 square nipples extending downwardly about 4 inches from uniformly spaced points. These nipples were $2\frac{1}{8}$ inches on a side. Extending from each gas space formed by the two rows of nipples was a gas withdrawal pipe of $1\frac{1}{2}$ inch diameter. The nipple withdrawal pipe was equipped with an orifice plate having a $\frac{3}{4}$ inch circular orifice. Two horizontal solids flow plates were provided below the lowest row of nipples, the upper of these was $5\frac{1}{2}$ inches below the lower ends of the lowest row of nipples and the lower $5\frac{1}{2}$ inches below the upper plate. The upper of these flow plates had a plurality of 2 inch circle slots therethrough arranged in 4 circular patterns which had radii of $2\frac{1}{2}$, $7\frac{3}{4}$, 13 and $18\frac{1}{4}$ inches respectively. The lower solids flow plate had 2 inch wide slots arranged in two circular patterns having radii of 5¼ and 15¾ inches respectively. The orifices in the lower plate were equipped with 2½ inch nipples. A funnel was arranged to catch all the catalyst from the inner ring of orifices in the lower plate. The lower end of this funnel had a 3⅝ inch diameter and the outlet conduit had a 9½ inch diameter at the level of funnel discharge. This apparatus disengaged about 900 pounds per hour of seal gas.

It should be understood that it is intended to cover herein all changes and modifications of the examples of the invention herein chosen for purposes of disclosure which do not constitute departures from the spirit and scope of the invention.

I claim:

1. An apparatus for removing granular solids from a high pressure contacting chamber and reducing the gaseous pressure associated with said solids, which comprises in combination: an upright cylindrical disengaging chamber, a depressuring leg conduit of substantially less cross-sectional area than said contacting chamber and said disengaging chamber extending from said contacting chamber into the upper end of said disengaging chamber and terminating centrally on a downwardly facing open discharge end therein, a solid upright frusto-conical shaped hood with sides extending downwardly and outwardly at an angle with the horizontal greater than 30 degrees to a region at least adjacent the walls of said disengaging chamber to thereby prevent substantially all free surface flow of granular solids as the solids issue from said conduit, a first plurality of vertically spaced horizontal plates all situated below said hood and all equipped with a plurality of uniformly spaced rectangular apertures, the uppermost of said first plurality of plates being situated immediately below said hood, a plurality of nipples of rectangular cross-sectional shape depending from each of said plates, one such nipple depending from each of said apertures and said nipples from each plate terminating on a common level intermediately between the plate from which the nipples depend and the one next below so that a horizontally continuous gas space is formed above the lower ends of the nipples and a horizontally continuous accumulation of contact material is formed on the plate below the nipples, a plurality of passageways extending from said chamber below each of said plates but above the lower end of each row of nipples so that gas will be removed from each of said gas spaces at a plurality of points, a manifold into which each of said gas passageways connects, a second plurality of horizontal plates extending across said chamber at spaced vertical intervals, each of said second plurality of plates being equipped with a plurality of apertures, which apertures decrease in number in successively lower plates and are arranged in staggered relationship to one another so that each plate below the upper receives proportional solids flow from the one above and the uppermost of said second plurality of plates being positioned immediately below the lower ends of the nipples extending downwardly from the lowermost of said first plurality of plates, and a central solids outlet conduit extending downwardly from the bottom of said chamber.

2. An apparatus for removing granular solids from a high pressure contacting chamber and reducing the gaseous pressure associated with said solids, which comprises in combination: an upright cylindrical disengaging chamber, a depressuring leg conduit of substantially less cross-sectional area than said contacting chamber and said disengaging chamber extending from said contacting chamber into the upper end of said disengaging chamber and terminating centrally on a downwardly facing open discharge end therein, a solid upright frusto-conical shaped hood with sides extending downwardly and outwardly at an angle with the horizontal greater than 30 degrees to a region at least adjacent the walls of said disengaging chamber to thereby prevent substantially all free surface flow of granular solids as the solids issue from said conduit, a first plurality of vertically spaced horizontal plates all situated below said hood and all equipped with a plurality of uniformly spaced rectangular apertures, the uppermost of said first plurality of plates being situated immediately below said hood, a plurality of nipples of rectangular cross-sectional shape depending from each of said plates, one such nipple depending from each of said apertures and said nipples from each plate terminating on a common level intermediately between the plate from which the nipples depend and the one next below so that a horizontally continuous gas space is formed above the lower ends of the nipples and a horizontally continuous accumulation of contact material is formed on the plate below the nipples, a plurality of passageways extending from said chamber below each of said plates but above the lower end of each row of nipples so that gas will be removed from each of said gas spaces at a plurality of points, a manifold into which each of said gas passageways connects, a second plurality of horizontal plates extending across said chamber at spaced vertical intervals, each of said second plurality of plates being equipped with a plurality of apertures, which apertures decrease in number in successively lower plates and are arranged in staggered relationship to one another so that each plate below the upper receives proportional solids flow from the one above and the lowermost plate having apertures arranged in two circular patterns, a central solids outlet conduit extending from the bottom of said chamber, a funnel positioned to catch all the granular solids flow from the inner circular pattern of the lower plate of said second plurality of plates and discharging in the mouth of said outlet conduit and having an outlet of an area which is in the same ratio to the area of the outlet conduit at the level at which the funnel terminates as the area of a circle of radius exactly intermediate the radii of the circular patterns in the lower plate of the second plurality of plates bears to the horizontal cross-section of the disengaging chamber.

References Cited in the file of this patent

UNITED STATES PATENTS

| | | |
|---|---|---|
| 2,489,628 | Evans | Nov. 29, 1949 |
| 2,595,224 | Caldwell | May 6, 1952 |
| 2,636,805 | Lassiat et al. | Apr. 28, 1953 |
| 2,647,044 | Savage et al. | July 28, 1953 |